No. 698,195. Patented Apr. 22, 1902.
W. G. HENDERSON.
SHEARS.
(Application filed July 8, 1901. Renewed Mar. 18, 1902.)
(No Model.)
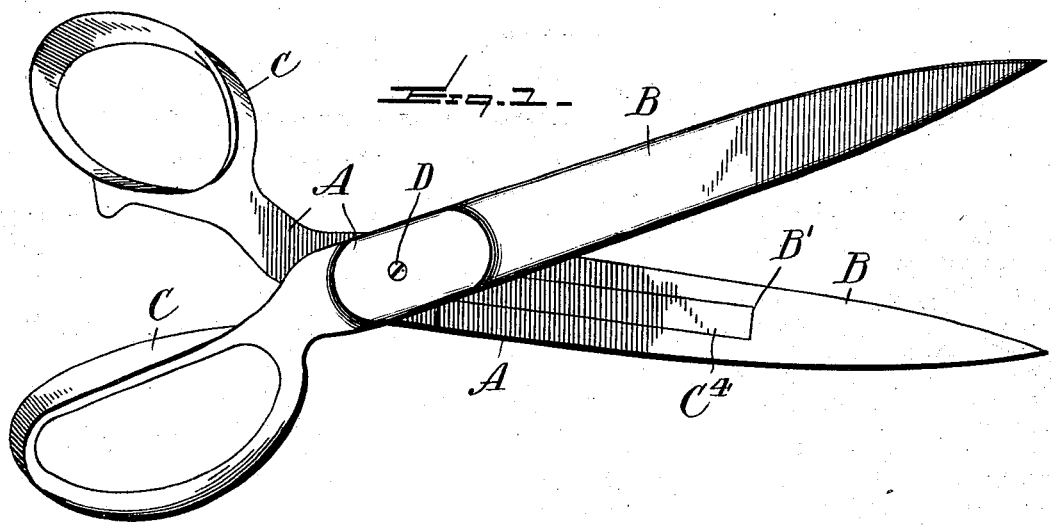
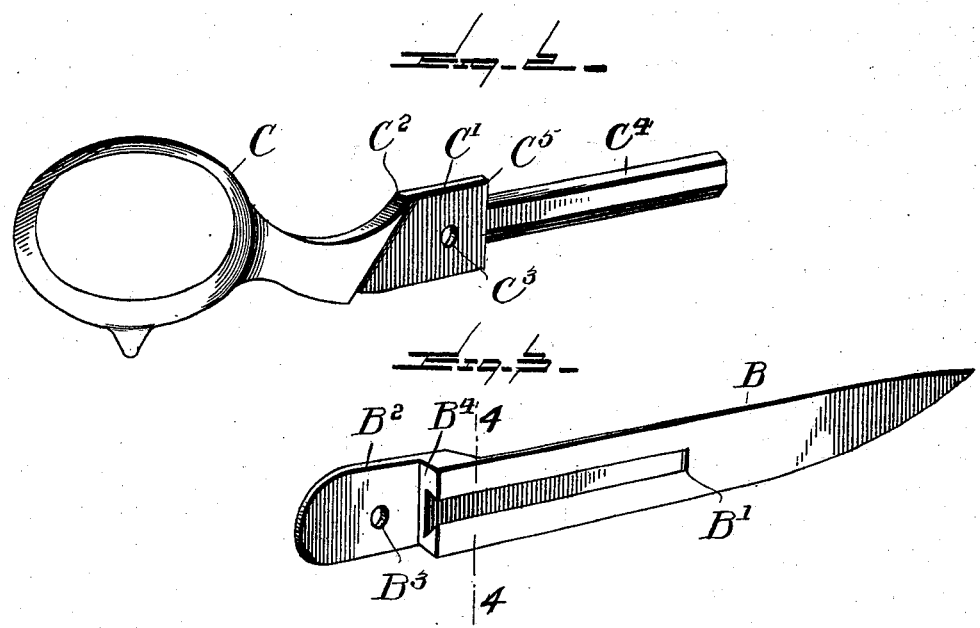
WITNESSES:
INVENTOR
William G. Henderson.
BY
Attorney

UNITED STATES PATENT OFFICE.

WILLIAM GUY HENDERSON, OF TITUSVILLE, PENNSYLVANIA, ASSIGNOR OF ONE-HALF TO EVERSON P. COLE, OF PITTSBURG, PENNSYLVANIA.

SHEARS.

SPECIFICATION forming part of Letters Patent No. 698,195, dated April 22, 1902.

Application filed July 8, 1901. Renewed March 18, 1902. Serial No. 98,721. (No model.)

*To all whom it may concern:*

Be it known that I, WILLIAM GUY HENDERSON, a citizen of the United States, residing at Titusville, in the county of Crawford, State of Pennsylvania, have invented certain new and useful Improvements in Shears, of which the following is a specification, reference being had therein to the accompanying drawings.

This invention relates to shears, and particularly to a structure by which handles and blades are adapted to be separately formed and removably attached.

The invention has for its object to produce an improved construction of handle and blade by which the two parts may be connected together and held by a single fastening device, while the strain upon the blade will be borne upon an extension from the handle and the use of blades of different lengths with the same size of handle permitted.

A further object of the invention is to provide for the use of different characters of material in the handle and blade and to so combine the parts that the direct strain in the cutting action will not be entirely borne by either the handle or the blade.

Other objects and advantages of the invention will hereinafter appear in the following description, and the novel features thereof will be particularly pointed out in the appended claims.

In the drawings, Figure 1 is an elevation of a pair of shears embodying my invention. Figs. 2 and 3 are detail perspectives of the handle and blade of one member of the shears, and Fig. 4 is a vertical section on the line 4 4 of Fig. 3.

Like letters of reference indicate like parts throughout the several figures of the drawings.

The invention has been shown as applied to shears; but it is quite capable of application to scissors or any other character of cutting device in which it may be desirable to construct the blade of steel or other preferred material for a cutting device, while the handle may be made of a cheaper or different material, such as cast metal.

The shears are, as usual, composed of two members A substantially similar in construction, having the blades B thereof suitably formed, so as to coöperate with each other when assembled in their cutting relation, as shown in Fig. 1. Each of the blades is provided with a handle C, adapted to be used, as usual, in this class of devices, while the members are secured together by means of a bolt D or other securing device common in the art. The handle C, as shown in Fig. 2, is provided with the pivoting-plate C', having thereon a shoulder $C^2$, against which the opposite member of the shears abuts when the same are in a closed position. The plate C' is provided with an aperture $C^3$, adapted to receive the bolt D, and with an extension $C^4$, adapted to lie within a recess B', formed within the blade B. This extension may be beveled or dovetailed, as shown, and the recess B' of a similar shape to receive the same and prevent any lateral movement of the parts upon each other. The blade B is further provided at its pivoting end with a lug $B^2$, having therein an aperture $B^3$, said lug being offset from the cutting-face of the shears to provide a shoulder $B^4$, adapted to abut against the shoulder $C^5$ of the handle when the bolt-apertures $B^3$ and $C^3$ are in alinement, the lug $B^2$ lying upon the outer face of the handle. The opposite member of the shears is of substantially similar construction, and when the parts are combined a flush and smooth cutting-face between the blades is provided.

It will be seen that the structure herewith presented permits the use of a single handle casting of one size with any desired length of blade, the construction of parts being so simple that the blades formed of different lengths and characters can readily be combined with a stock-handle, thus materially economizing in the manufacture of shears and similar tools.

A further important feature of construction is the manner of connecting the handle and blade by which the cutting strain through tough material is relieved or removed from a single point and applied upon an extended bearing formed by the tongue or extension $C^4$ resting in the recess in the blade, and this extension prevents all movement of the blade upon the handle when the parts are assembled and held by the single securing-bolt, which prevents any longitudinal movement of the blade upon the extension from the handle, while the beveled or dovetailed construction retains the parts against lateral movement.

It will be obvious that changes may be made in the details of construction or configuration of either the blade or the handle without departing from the spirit of the invention as defined by the appended claims.

Having described my invention, what I claim is—

1. A shears comprising a cutting member having a handle provided with a pivoting-plate and an extension beyond the pivot in the plane of said plate, a blade provided with a recess parallel with the edge thereof to receive said extension and a pivoting-ear adapted to lie upon the outer face of said plate, and a pivot passing through said ear and plate; substantially as specified.

2. A shears comprising opposite cutting members each having a handle portion provided with a pivoting-plate and a beveled extension in the plane thereof, a cutting-blade for each member provided with an undercut recess to receive said extension and a pivoting-ear to lie upon the outer face of said plate, and a pivoting device passing through the ears and plates of both members of the shears to hold the blades against longitudinal movement and to clamp the members of the shears into contact with each other; substantially as specified.

In testimony whereof I affix my signature in presence of two witnesses.

WILLIAM GUY HENDERSON.

Witnesses:
GUS. SWANDER,
FRANK ALLEN.